US008206045B2

(12) United States Patent
Sweeney et al.

(10) Patent No.: US 8,206,045 B2
(45) Date of Patent: Jun. 26, 2012

(54) HANDS-FREE CAMERA HOLDER

(75) Inventors: Theresa M. Sweeney, Taunton, MA (US); Mark Whittaker, Berkeley, MA (US)

(73) Assignee: Theresa M. Sweeny, Taunton, MA (US)

( * ) Notice: Subject to any disclaimer, the term of this patent is extended or adjusted under 35 U.S.C. 154(b) by 0 days.

(21) Appl. No.: 12/785,289

(22) Filed: May 21, 2010

(65) Prior Publication Data

US 2011/0052178 A1 Mar. 3, 2011

Related U.S. Application Data

(60) Provisional application No. 61/180,177, filed on May 21, 2009, provisional application No. 61/221,355, filed on Jun. 29, 2009.

(51) Int. Cl.
*G03B 17/00* (2006.01)
*H04N 5/225* (2006.01)

(52) U.S. Cl. ........ 396/420; 396/423; 396/424; 396/425; 396/428

(58) Field of Classification Search .................. 396/420, 396/423, 424, 425, 428; 348/373, 375
See application file for complete search history.

(56) References Cited

U.S. PATENT DOCUMENTS

| 5,172,147 A * | 12/1992 | Rockhill | 396/428 |
| 6,017,010 A * | 1/2000 | Cui | 248/288.31 |
| 6,123,306 A * | 9/2000 | Jackson | 248/296.1 |
| 2008/0131106 A1* | 6/2008 | Bruce | 396/25 |

* cited by examiner

*Primary Examiner* — Rochelle-Ann J Blackman
(74) *Attorney, Agent, or Firm* — McDermott Will & Emery LLP

(57) ABSTRACT

Embodiments of hands-free camera holders according to the present disclosure can enable a user to obtain the exact picture they want by giving them complete control of the camera position. A hands-free camera holder can include a camera support member, e.g., a platform, that is connected by way of an adjustable frame. In optional embodiments, the user can connect to the frame by way or a collar/harness. By using a switch, or trigger means, that is connected to the camera, to take the picture, the framing of the picture is not disturbed, whether activated by the user or an assistant. The separate switch concept/means can also enable individuals with disabilities to use other parts of their body to operate the camera. Using adaptive technology, any reliable movement can be used as a trigger for the camera.

14 Claims, 6 Drawing Sheets

HANDS-FREE CAMERA HOLDER

RELATED APPLICATIONS

This application claims priority to U.S. Provisional Patent Application No. 61/180,177, entitled "Hands Free Camera Holder," filed 21 May 2009; this application also claims priority to U.S. Provisional Patent Application No. 61/221,355, entitled "Hands Free Camera Holder," filed 29 Jun. 2009"; the entire contents of both of which application are incorporated herein by reference.

BACKGROUND

Existing techniques for allowing disabled people, including those having limited or reduced dexterity of one or both of their hands, to hold, grasp, manipulate, and operate cameras have been limited. Up until now, someone such as an assistant has typically been required to hold the camera for the disabled individual, while they (the assisting person) tried to push the shutter release. Typically, such assistance has, because of the camera movement induced by the assistant, resulted in an altered or blurred frame of the picture compared to what was desired.

SUMMARY

Aspects of the present disclosure are directed to systems and methods that address limitations noted previously by providing an adjustable camera holder that allows a user with limited dexterity to use the camera. The camera holder can include a support member, for holding the camera, that is adjustable for height, distance, and side-to-side position of a camera relative to a user's face and eyes. The camera held by the camera holder can be positioned in space relative to a user, such a person in a wheel chair, who has limited mobility or use of his or her hand(s). Such a camera holder can include a trigger device, or trigger means, for activating the camera. The trigger device can be such that it is activated by other modalities than the person's hands.

A hands-free camera holder according to an embodiment of the present disclosure can include an adjustable frame that provides a stable camera platform that is adjustable in three directions, or difference axes, relative to a user. The frame can include one or more portions that are extendable and/or articulating and/or rotatable, such that a support member, e.g., a camera platform, can be adjusted relative to a user sitting in a chair, e.g., wheelchair, attached, connected, or adjacent to the frame.

In exemplary embodiments, an adjustable camera holder can include a portion that is worn around the neck of the individual using the camera. For such a configuration, the frame can rest against a user's chest and/or neck.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
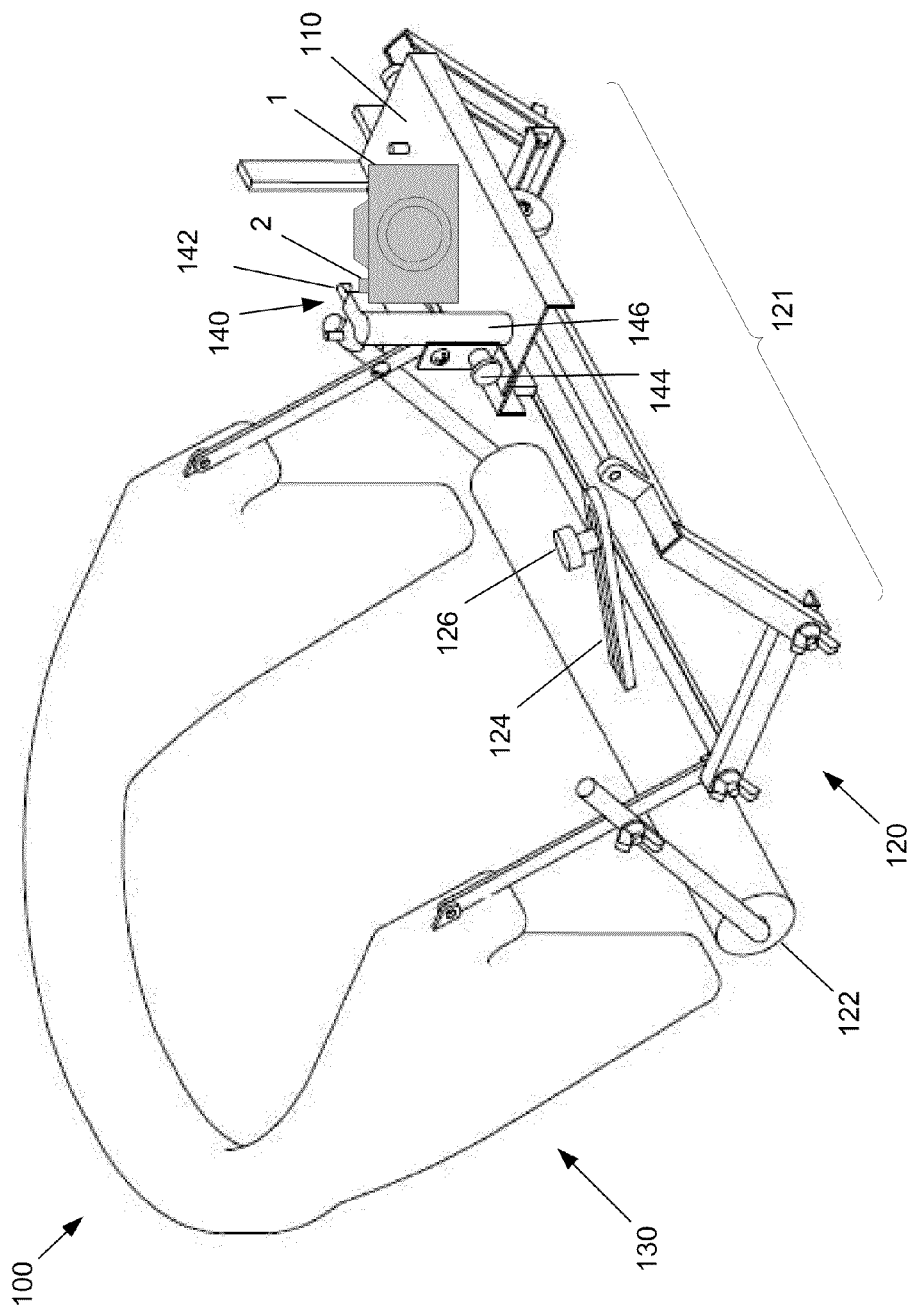
FIG. 1 is a perspective view of an exemplary embodiment of a hands-free camera holder, in accordance with the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Embodiments of the present disclosure are directed to systems and methods for providing use of a camera by a person with limited or reduced dexterity. The camera holder can include a support member, for holding the camera, that is adjustable for height, distance, and side-to-side position of a camera relative to a user's face and eyes. The camera held by the camera holder can be positioned in space relative to a user, such a paraplegic person in a wheel chair, who has limited mobility or use of his or her hands. Such a camera holder can include a trigger device, or trigger means, for activating the camera. The trigger device can be such that it is activated by other modalities than the person's hands.

Such a holder enables individuals with disabilities to take pictures. This applies to elderly, accident victims, or other ambulatory challenged individuals. The camera can be activated with any switch closure so the use of hands is not required.

Embodiments of hands-free camera holders according to the present disclosure can enable a user to obtain the exact picture they want by giving them complete control of the camera position. By using a switch, that is not directly mechanically connected to the camera, to take the picture, the framing of the picture is not disturbed. The separate switch concept also enables individuals with disabilities to use other parts of their body to operate the camera. Using adaptive technology, any reliable movement can be used as a trigger for the camera.

FIG. 1 is a perspective view of an exemplary embodiment 100 of a hands-free camera holder, in accordance with the present disclosure. The camera holder 100 can include a camera support member 110, e.g., a platform, that is connected by way of an adjustable frame 120 to a collar/harness 130 that can be worn by a user. For example, a user could place the collar 130 around his or her neck, when using the adjustable camera holder 100 to operate a camera 1. In exemplary embodiments, suitable aluminum alloy, e.g., 6061 aluminum, can be used for the material of the frame 120 and support member 110. Of course, while shown in the drawing as facing out of the page, camera 1 would normally be positioned with the objective lens in a plane substantially parallel to the plane connecting the eyes of a user.

The camera support member 110 serves to support a camera 1. The support member 110 can be connected to or include a slide, e.g., a collar (not shown) that is configured to slide along and/or rotate about rod 127. Accordingly, support member 110 can be moved side to side and/or about a pitch axis relative to the user. The support member 110 can include one or more features/structures 114 for securing a camera 1 to the support member 110, e.g., pegs, posts, grooves, clamps, rugosities, etc. In some embodiments, support member 110 can be adjustable in one to three dimensions and/or one to three axes of rotates relative to the frame 120.

The adjustable frame 120 can include a position-adjustable member 121 that can be moved in one or more directions (axes) relative to a user. The adjustable frame 120 can also include a bar 122, preferably padded, which can be positioned against the user, e.g., the user's chest. The position-adjustable member 121 can be adjusted relative to the bar 122 by way of a slidable adjustment tab or member 124 and adjustment screw 126, in exemplary embodiments. Because frame 120 is adjustable, it can be moved in or out, and up and down, relative to the user; for such, suitable pivoting joints and/or hinge can be used.

The collar/harness 130 can be adapted to fit a user. While the collar 130 in the drawings is shown as forming a closed loop with the adjustable frame 120, this is not necessary and the collar/harness 130 may be open, thus facilitating ease of entry. In preferred embodiments, the collar/harness 130 is padded for user comfort. The collar/harness may be made of any suitable material, e.g., nylon, woven plastic, leather, etc.

Figure 2:
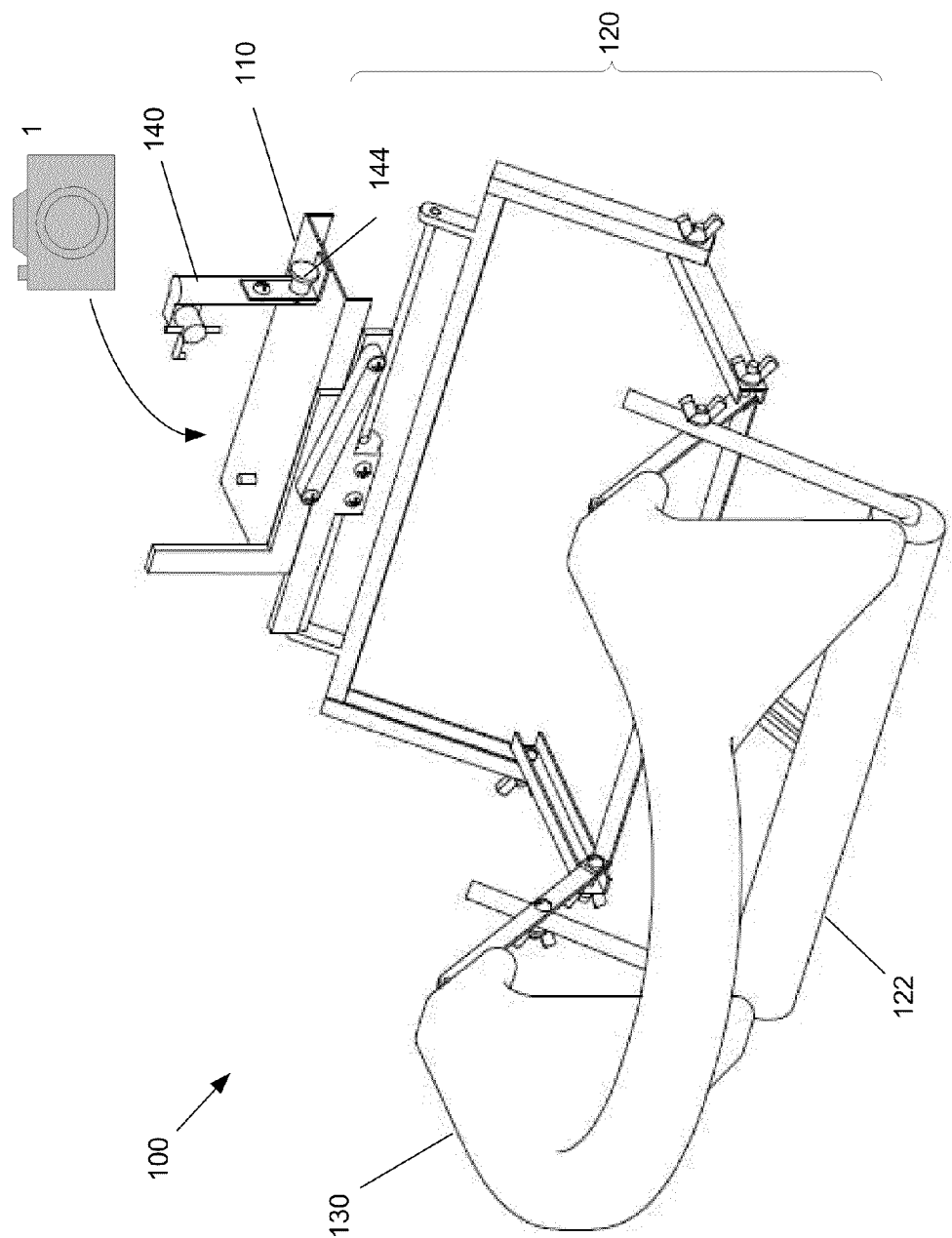
FIG. 2 is an alternate perspective view of the embodiment of FIG. 1.

As shown in FIG. 1, a trigger mechanism or trigger means 140 (e.g., a push button, grip trigger, foot pedal, etc. that can be used as a means to operate the camera shutter trigger) can be connected to the shutter/shutter button of the camera 1 so that the camera shutter can be activated at the behest/command of the user. The trigger means can include an activation lever 142 connected to an input 144 by way of a linkage and/or structure 146. Exemplary embodiments can include a trigger that includes a blow-tube apparatus. For such embodiments, a user can control the camera shutter by blowing into or sucking on the tube. The trigger means/mechanism 140 can alternatively be triggered by another person, e.g., a nearby assistant listening for a verbal command from the user. Control of the shutter can be provided through mechanical means activated via electronic control, pneumatic control, mechanical control, etc. Other embodiments can be adapted to have a shutter trigger mechanism operated by, e.g., a user's tongue acting as the mechanical means to activate a switch that is connected to the camera 1 trigger 2, e.g., my trigger means 140. Shutter control can be affected by any type of a momentary switch closure that can be generated by the individual. Switch input can be adapted to facilitate any individual with the ability to produce any type of reliably repeatable action. Padding can be provided in all areas that contact the individual. In some embodiments a cable with a squeeze trigger can be connected to input 144 for activating the camera trigger 2. In other embodiments, e.g., as described in further detail below, other modalities such as a blow tube may be used to activate the trigger 2 of the camera 1. FIG. 2 is an alternate perspective view of the embodiment 100 of FIG. 1.

Figure 3:
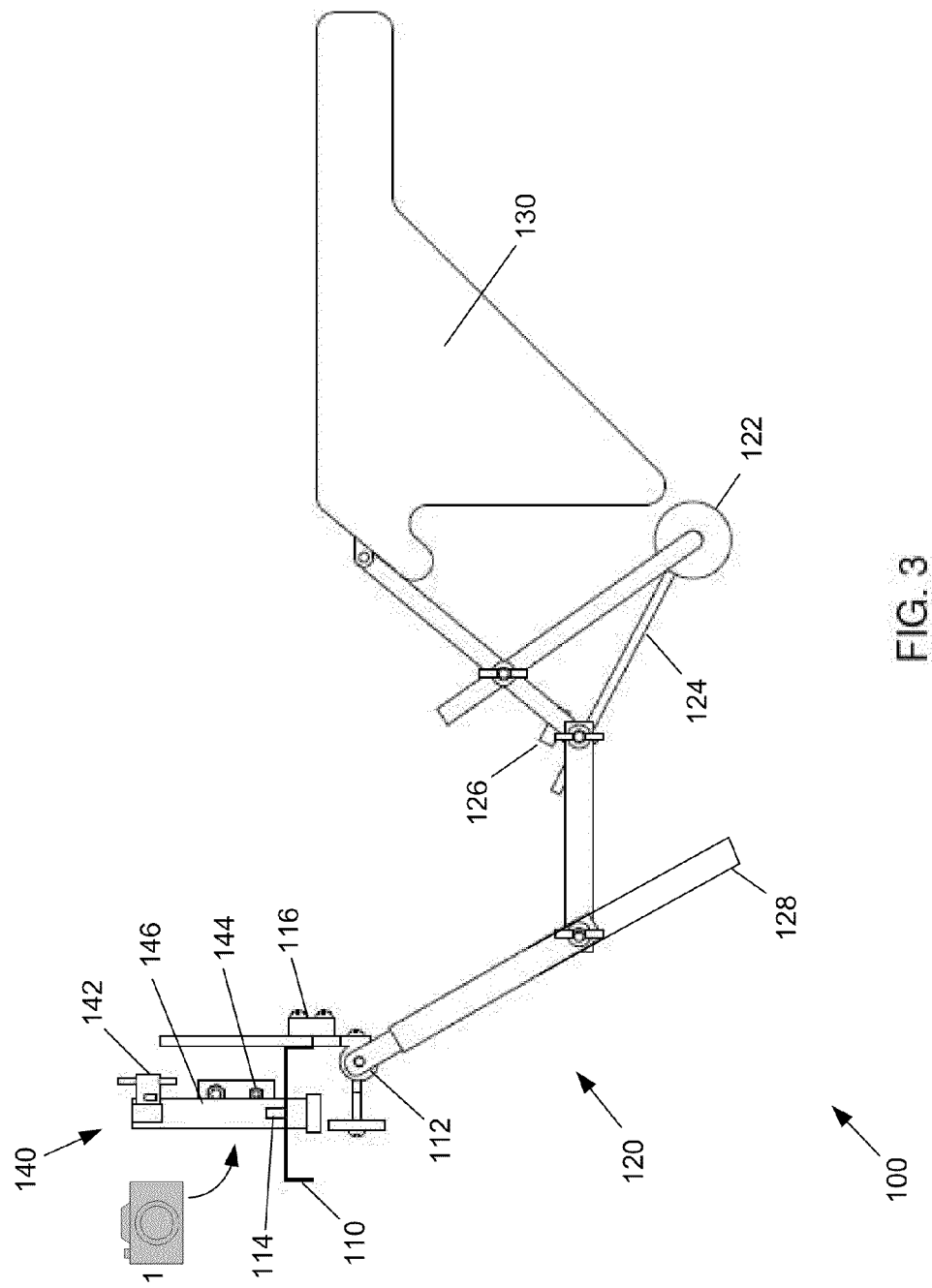
FIG. 3 depicts a side view of the hands-free camera holder of FIGS. 1-2 used by another user.

FIG. 3 depicts a side view of the hands-free camera holder 100 of FIGS. 1-2. As shown in FIG. 3, one or more portions of frame 120 or support member 110 can include optional extensions 128, e.g., handles, that can facilitate positioning of the frame or support member by the user or an assistant.

Figure 4:
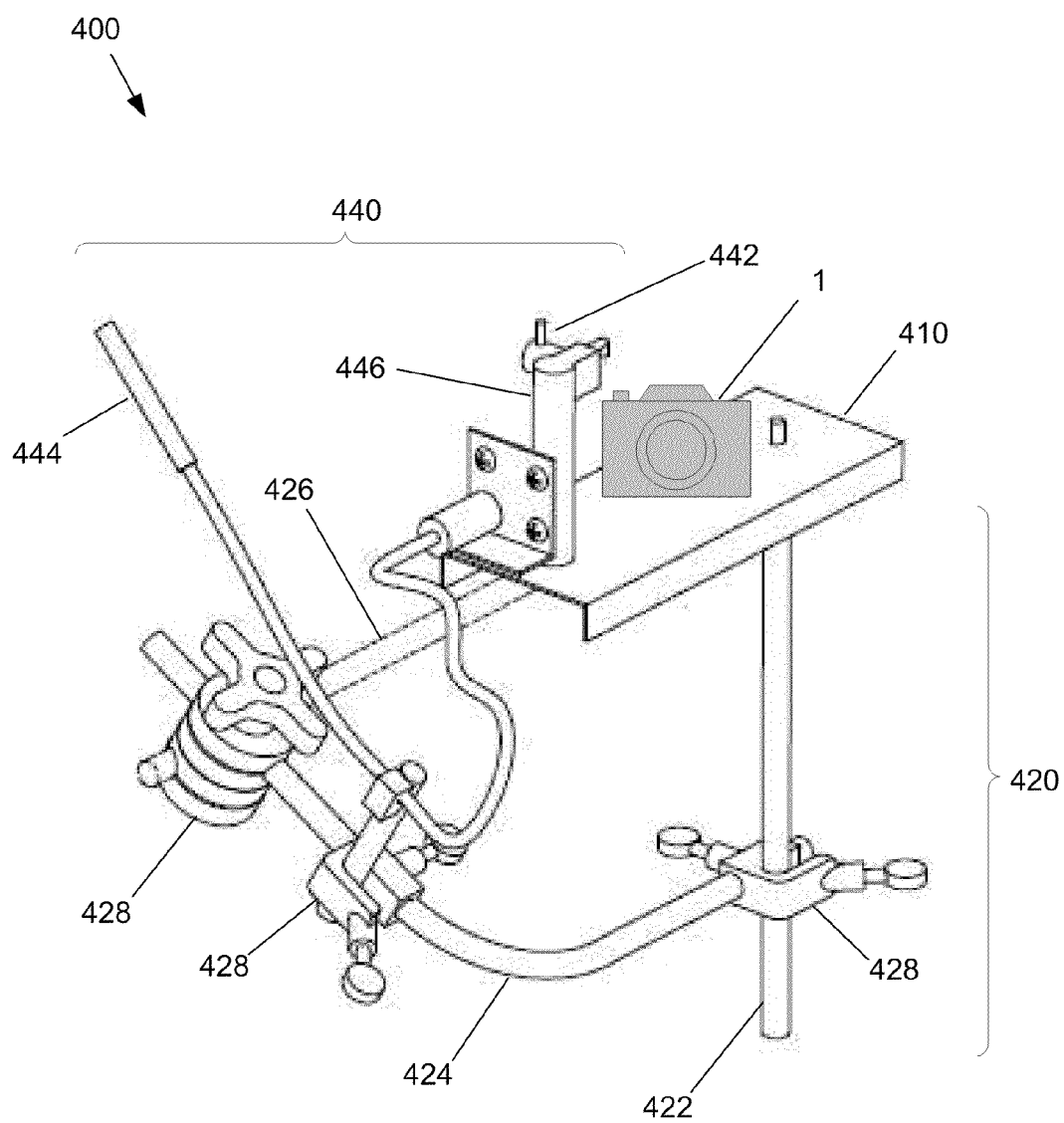
FIG. 4 depicts a perspective view of a hand-free camera holder, in accordance with a further embodiment of the present disclosure.
Figure 5:
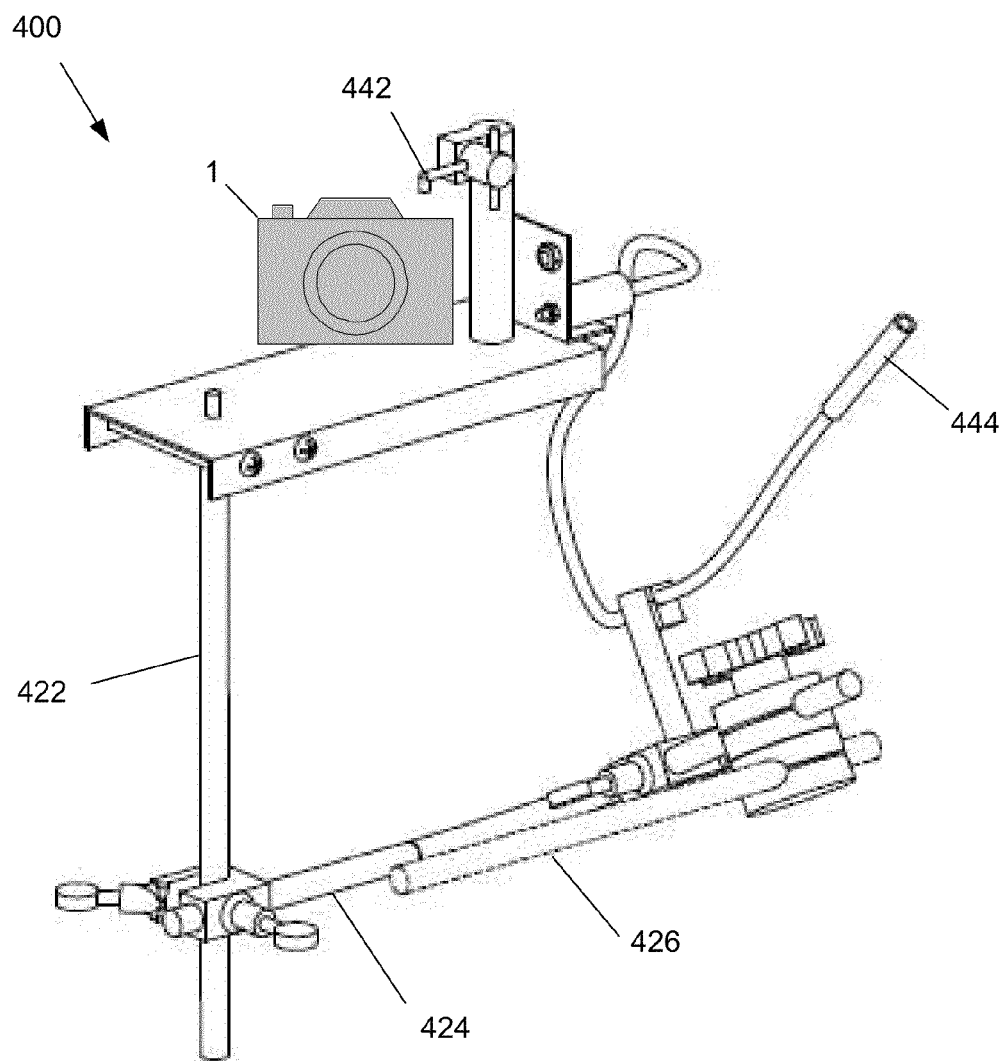
FIG. 5 depicts another perspective view of the hands-free camera holder of FIG. 4.
Figure 6:
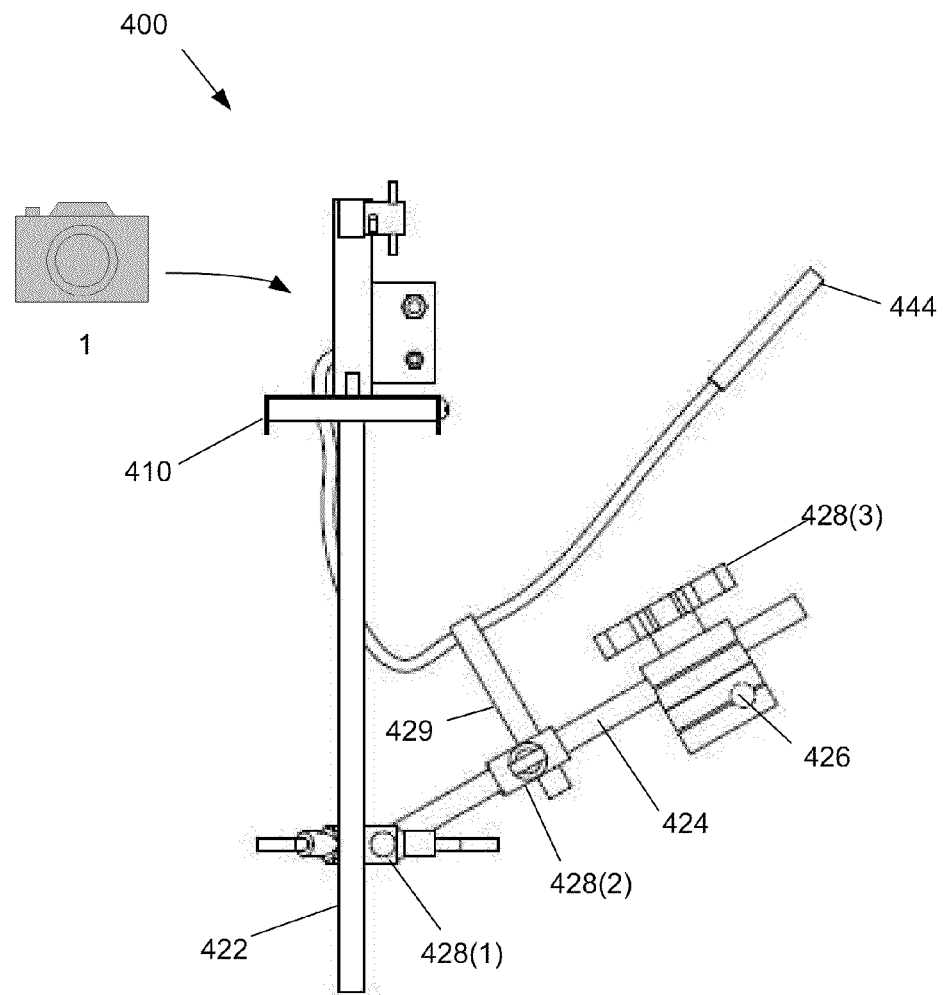
FIG. 6 depicts a side view of the embodiment of FIGS. 4-5.

FIGS. 4-6 depict a further embodiment 400 of a hand-free camera holder in accordance with the present disclosure, which is configured and arranged for connection to a structure or vehicle, e.g., a user's wheel chair.

As shown in FIG. 4, the embodiment 400 can include a camera support member 410, for holding a camera 1, that is connected by way of an adjustable support frame or means 420. The embodiment 400 can in lead a means for triggering (or trigger means) 440 for activating the shutter of a camera 1. In exemplary embodiments, a blow tube (or straw) 444 apparatus can be utilized for the trigger means 440 for triggering/control of the camera shutter system. Any suitable method/structure can be used to attached or fix the frame 420 to a user's chair or vehicle, e.g., clamp, fixed structure, etc.

Similar to support member 110 of FIGS. 1-3, support member 410 can include, optionally, various surface features or structures that can facilitates holding of a camera on the support member 410.

The adjustable support means or frame 420 can include one or more frame members, e.g., members 422, 424, and 426. The support members can be attached by adjustable attachment structures, e.g., screw clamps 428. Such screw clams can adjustable secure each of the two or more members that are attached.

As with the embodiment shown in FIGS. 1-3, the frame 420 and support member 410 of FIG. 4 can function individually or un unison such that a camera 1 can be adjusted in three dimensions (axes) relative to a user, e.g., sitting in a wheel chair attached to the frame 420 via frame member 426. In exemplary embodiments, the frame and/or support member 410 can in addition provide the functionality of rotation of the camera about one to three rotational axes in relation to the user. Thus, the frame, including support member 410, can mimic the flexibility of a user's shoulder(s), arm(s), wrist(s), and/or hand(s) in supporting a camera for use by the user.

As further shown in FIG. 4, a blow tube 444 can include a tube or straw and may also include related bladder/diaphragm components with suitable pneumatic or hydraulic components and connections to trigger/activate the shutter on the camera. Other components may also be used, e.g., pressure sensitive capacitive MEMS sensors.

FIGS. 5 and 6 show alternate perspectives of embodiment 400. As is shown in FIG. 6, blow tube 444 can be supported by the frame 420, e.g., by member 424 by a support post 429 connected to two-way screw claim 428(2); two other screw clamps 428(1) and 428(3) are also shown.

Accordingly, embodiments of hands-free camera holders according to the present disclosure can enable a user to obtain the exact picture they want by giving them complete control of the camera position. By using a switch, or trigger means, that is connected to the camera, to take the picture, the framing of the picture is not disturbed, whether activated by the user or an assistant. The separate switch concept/means can also enable individuals with disabilities to use other parts of their body to operate the camera. Using adaptive technology, any reliable movement can be used as a trigger for the camera.

The techniques and embodiments of the present disclosure are capable of other and different embodiments, and details of such are capable of modification in various other respects. Accordingly, the drawings and detailed description are to be regarded as illustrative in nature and not as restrictive. While certain embodiments depicted in the drawings, one skilled in the art will appreciate that the embodiments depicted are illustrative and that variations of those shown, as well as other embodiments described herein, may be envisioned and practiced within the scope of the present disclosure.

Commercial uses of embodiments of the present disclosure can include allowing anyone unable to hold a camera steady and push the button. Any major camera or manufacturer could find such attractive because it enables them to sell cameras to individuals who could not normally use one.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

In reading the present disclosure, one skilled in the art will appreciate that embodiments of the present disclosure can be implemented in hardware, software, firmware, or any combinations of such, and over one or more networks. Suitable software can include computer-readable or machine-readable instructions for performing methods and techniques (and portions thereof) of designing and/or controlling the implementation of tailored RF pulse trains. Any suitable software language (machine-dependent or machine-independent) may be utilized. Moreover, embodiments of the present disclosure can be included in or carried by various signals, e.g., as transmitted over a wireless RF or IR communications link or downloaded from the Internet.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claims is:

1. A hands-free camera holder comprising:
   a support member configured to support a camera;
   an adjustable frame connected to the support member and including a collar configured to be placed around a user's neck, wherein the adjustable frame is adjustable in three dimensions relative to the user, wherein the adjustable frame is adjustable for height, distance, and side-to-side positioning relative to the collar; and
   a trigger means configured to activate the shutter of the camera by physical input of a user.

2. The camera holder of claim 1, wherein the trigger means is a blow tube.

3. The camera holder of claim 1, wherein the trigger means is a squeeze tube.

4. The camera holder of claim 1, wherein the trigger means comprises a button linked on top the camera trigger by electrical and/or mechanical linkage.

5. The cameral holder of claim 1, wherein the adjustable frame is adjustable in one dimension relative to the user.

6. The cameral holder of claim 1, wherein the adjustable frame is adjustable in two dimensions relative to the user.

7. The cameral holder of claim 1, wherein the adjustable frame is moveable such that the support member is rotatable about one rotational axis relative to the user.

8. The cameral holder of claim 1, wherein the adjustable frame is moveable such that the support member is rotatable about two rotational axes relative to the user.

9. The cameral holder of claim 1, wherein the adjustable frame is moveable such that the support member is rotatable about three rotational axes relative to the user.

10. The cameral holder of claim 1, wherein the support member is rotatable about one rotational axis relative to the user.

11. The cameral holder of claim 1, wherein the support member is rotatable about two rotational axes relative to the user.

12. The cameral holder of claim 1, wherein the support member is rotatable about three rotational axes relative to the user.

13. The cameral holder of claim 1, wherein the support member comprises support for one or more structures for holding a camera.

14. The camera holder of claim 1, further comprising a harness for a user.

* * * * *